Jan. 26, 1965   J. P. KRIECHBAUM   3,167,251
TEMPERATURE CONTROL APPARATUS
Filed Sept. 26, 1962
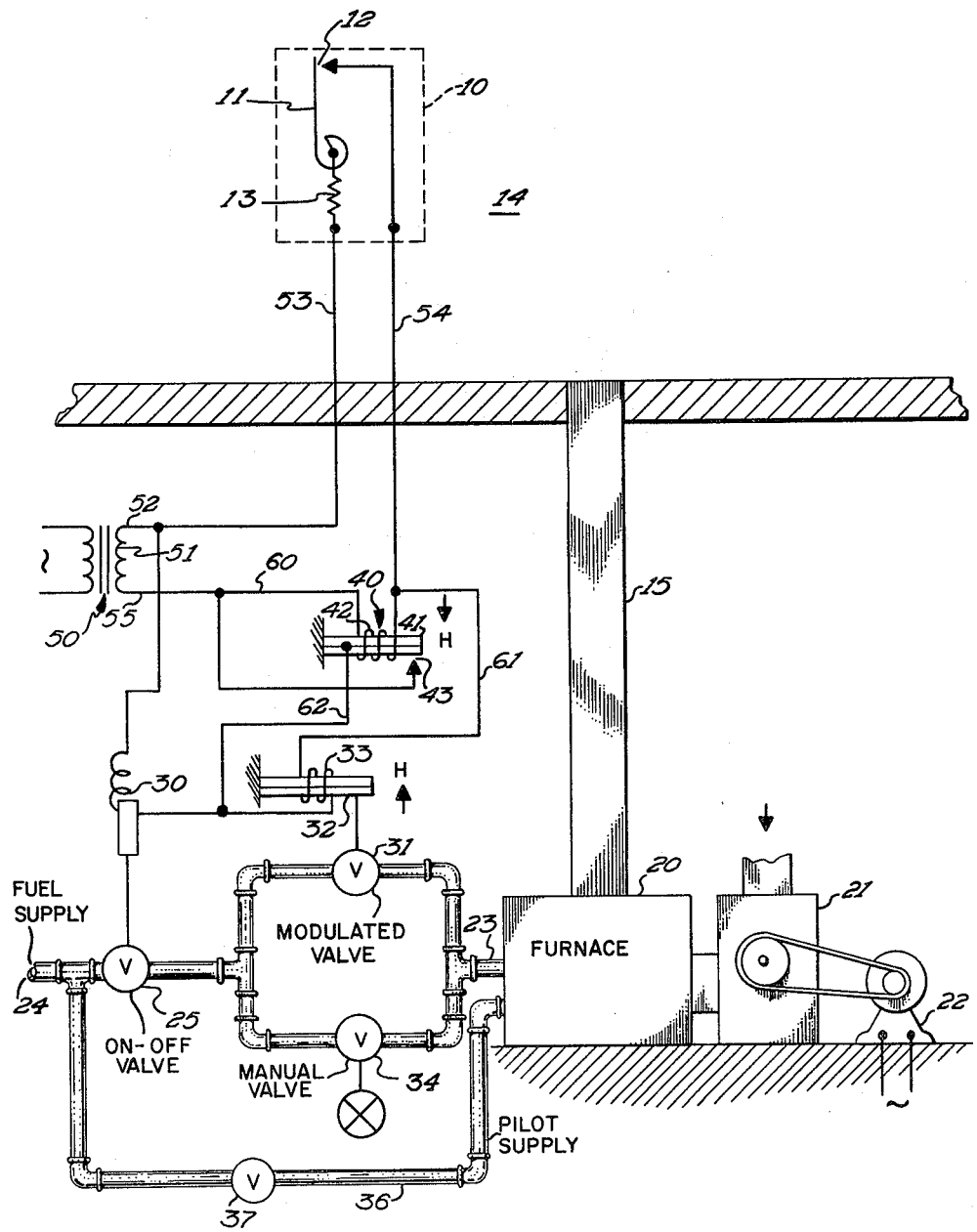
INVENTOR.
JOHN P. KRIECHBAUM
BY
Clyde C. Blinn
ATTORNEY

United States Patent Office 3,167,251
Patented Jan. 26, 1965

3,167,251
TEMPERATURE CONTROL APPARATUS
John P. Kriechbaum, Minneapolis, Minn., assignor to Honeywell Inc., a corporation of Delaware
Filed Sept. 26, 1962, Ser. No. 226,388
4 Claims. (Cl. 236—68)

The present invention is concerned with an improved modulating fuel flow control; in particular, a modulating fuel valve is controlled by the cyclic output of an integrating relay which is controlled by a space temperature responsive means having an output indicative of the heating load. A direct feedback signal to the space temperature responsive means is provided to modify the control point proportional to the amount of energization of the modulating valve.

While modulating fuel flow systems are broadly old, numerous schemes have been studied and proposed for controlling a modulating fuel valve from a space thermostat to obtain relatively stable control of the space temperature. In many of these systems, the inherent lag of the system as a result of the control apparatus and primarily the thermal inertia of the heating system has resulted in unstable systems. In a control system making use of a thermal actuator or slow operating relay for driving a slow operating valve actuator, the inherent delay in the system can result in numerous problems as far as the control aspects are concerned.

In the present invention, the shortcomings of a system having considerable inertia both in the control system and in the conditioning apparatus or furnace was overcome by the use of a novel feedback arrangement which was accomplished by feeding back an anticipation signal to the primary controller when the secondary control energized the control device. With a thermostat controlling an integrating relay, a signal was available when the integrating relay energized a modulated valve to reset the control point of the thermostat when the thermostat was calling for a change in the space temperature to stabilize the system.

An object of the present invention is to provide an improved modulating valve control system having a cyling thermostat for controlling an integrating relay wherein a feedback signal is applied to the thermostat upon the energization of the relay to reduce the control point of the thermostat and stabilize the system.

Another object of the present invention is to provide in a normal thermostat having heat anticipation which is connected to control an integrating type valve controller, a second heat signal applied to the thermostat to further reduce the control point when the thermostat is calling for a need for temperature conditioning to anticipate the effect of the conditioning apparatus operation.

These and other objects of the present invention will become apparent upon the study of the following specification and claims of which:

A single figure shows a schematic representation of the control system having a space thermostat for controlling a relay which controls a modulating valve system in a fuel supply to a furnace.

Referring to the single figure, a thermostat 10 has a bimetal 11 which controls the operation of a switch 12. A heater resistance 13 connected in series with switch 12 is mounted to thermally heat bimetal 11 when current is flowing through the thermostat. Thermostat 10 is mounted in a space 14 which receives heat from a supply duct 15 connected to a furnace 20 through which air is circulated under the force of a fan 21 driven by a constantly energized motor 22. Furnace 20 is of a conventional type having a burner to which fuel or gas is supplied by a pipe 23.

A fuel control system is connected between a fuel supply 24 and conduit 23 to control the flow of fuel to furnace 20. A conventional on-off valve 25 of a type shown in the McCabe Patent 1,834,287 has a solenoid 30 which opens valve 25 when the solenoid is energized. Connected downstream of valve 25 is a valve 31 of a conventional modulating type as shown in the McCorkle Patent 2,118,443. Valve 31 has an operator comprising a bimetal 32 which is heated by heater 33. When heater 33 is energized, bimetal 32 moves upward to open the valve slowly. Connected in parallel with valve 31 is a manual operated valve 34 to provide a minimum flow of fuel to the burner when valve 25 is opened, regardless of the position of valve 31. A conventional pilot burner in furnace 20 is supplied through a separate pipe 36 and valve 37.

An integrating relay or bimetal operated switch device 40 comprises a bimetal 41 which is heated by heater winding 42 to close a switch 43 when bimetal 41 moves downward upon being heated. While the integrating relay is shown as a bimetal type, any type of time-delay switch operator for closing a switch in response to a percent "on" time of energization of an actuator could be used. A source of power 50 comprises a step-down transformer having a primary winding and a secondary winding 51.

Winding 42 of the integrating relay is connected to the switch 12 of thermostat 10 to be energized by the source of power when the thermostat is closed through a circuit traced as follows: from the upper terminal 52 of secondary 51, a conductor 53, heater 13, switch 12, conductor 54, winding 42, and back to the lower terminal 55 of the secondary through a conductor 60. Upon a drop in the space temperature of space 14, thermostat 10 senses a need for heat and switch 12 closes to energize the integrating relay 40. When switch 12 closes, the current circulating through heater 13 provides false heat to the thermostat which is commonly known as "heat anticipation." The "heat anticipation" causes a cyclic operation of thermostat 10, and the total closed time of switch 12 is proportional to the drop in space temperature below some predetermined control point or the heating load of the space 14. When the total time of energization of winding 42 over a certain period exceeds some predetermined value, bimetal 41 moves downward to close switch 43.

Switch 43 is connected in the energization circuit of winding 33 by a circuit traced as follows: from the upper terminal 52 of the secondary, conductor 53, switch 12, conductor 54, a conductor 61, winding 33, a conductor 62, switch 43, and back to the other side 55 of the source of power. The impedance of windings 42 and 33 are selected to prevent any adverse operation by the series circuit through windings 30, 33 and 42. As the switch 43 closes, solenoid 30 is energized by a circuit from terminal 52, coil 30, conductor 62, switch 43 and back to 55 to open the valve to provide the flow of fuel to the furnace. At the same time, winding 33 is energized to slowly open valve 31 to a degree depending upon the total energized time of winding 33. Since the current for winding 33 is circulated through the thermostat and heater 13, an additional artificial heat is delivered to thermostat 10 when the valve operator is energized. The additional heat is a feedback signal to thermostat 10 to reduce the control point in an attempt to assist the thermostat in anticipating the effect of the energization of furnace 20.

Upon the operation of the system, the cyclic closing action of switch 12 provides for the energization of the integrating relay 40 to close switch 43 when the heating load reaches some predetermined value. Whenever winding 30 is energized, the on-off valve 25 will be opened. Each time the modulated valve actuator 32 is energized, a feedback signal is delivered to the thermostat 10 by the additional current flow through heater 13 to anticipate the effects of the energization of the burner in the furnace. By making the feedback circuit through the switch 12 of the thermostat, the feedback is only available when thermostat 10 is calling for the need of heat. Such a control system overcomes the thermal inertia of furnace 20 as well as the inertia of the integrating relay 40 and the modulating actuator for valve 31 to increase the stability of the system and maintain the space temperature at an even level depending upon the control point setting of thermostat 10.

While the invention has been described in one particular manner, the intent of the applicant is to limit the invention only to the scope of the appended claims in which

I claim:

1. In a control system for modulatingly delivering fuel to a heater supplying heat to a space,
   a space temperature responsive switch device, said responsive device having an anticipation heater,
   a source of power,
   an integrating bimetal operated switching device having a heater for heating said bimetal,
   circuit means including said switch device for connecting said heater to said source to control said switching device in accordance with the heating load of said space,
   first valve means having an energization winding to open said valve,
   circuit means including said switching device for connecting said valve means to said source.
   second valve means having a modulating operator which upon being energized said valve is slowly opened,
   circuit means connecting said operator to said source through said responsive switch means and said switching device,
   conduit means connecting said first and second valve means in series between a source of fuel and a fuel burner,
   and a manual control bypass for said second valve means whereby said minimum flow of fuel can be set to flow when said first valve is opened, said second valve controlling the fuel flow depending on the heating load of said space.

2. In a control system for delivering fuel to a burner, first valve means having a first energization winding for providing on-off control of fuel flow, second valve means having a second energization winding for providing modulating control of the flow of the fuel, a thermostat in a space to be heated, heating means to artificially heat said thermostat for cycling said thermostat in response to heating load, an integrating relay means, a source of power, means including said thermostat connecting an energization winding of said relay means to said source, said relay means being adapted to control the energization of said first and second energization windings from said source, and means including said heating means responsive to the energization of one of said energization windings for resetting a control point of said thermostat.

3. In a control system for a modulated gas supply to a burner having a modulated valve means and an on-off valve means connected in series between a fuel source and a burner, a space thermostat having an anticipation means for changing a controlled temperature of said thermostat as a heating load increases, an integrating relay means, a source of power, means including said thermostat and said anticipation means for connecting said source to an energization winding of said relay means, circuit means including said relay means for connecting said on-off valve means to said source, circuit means including said thermostat, said anticipation means and said relay means for connecting said modulated valve to said source of power whereby said integrating relay means can initiate fuel flow and control the fuel flow in response to a heating load in said space, said last mentioned circuit means providing feedback means operative with said relay means for changing said control temperature to stabilize the system in anticipation of the operation of the burner.

4. In a control system for delivering gas to a burner supplying heat to a space, a space temperature responsive switch device closing when the temperature of said space reaches a selected value, said responsive device having an anticipation heater to artificially heat said responsive device, a source of power, an integrating switching device having an energization means, circuit means including said switch device and said heater for connecting said energization means to said source to control said switching device in accordance with the heating load of said space, valve means having a modulating operator which upon being energized said valve means is slowly opened and upon being de-energized said valve means is slowly closed, circuit means connecting said operator to said source through said responsive switch device, said heater and said switching device, and conduit means connecting said valve means between a source of gas and the burner, said last mentioned circuit means increasing the current through said anticipation heater to additionally heat said temperature responsive device when said valve means is energized.

References Cited by the Examiner

UNITED STATES PATENTS 2,286,296 6/42 McGrath.
2,339,618 1/44 Crago.
3,091,394 5/63 Sparrow _____ 236—68

EDWARD J. MICHAEL, *Primary Examiner.*